United States Patent [19]
Eells

[11] 3,782,341
[45] Jan. 1, 1974

[54] ROTARY INTERNAL COMBUSTION ENGINE

[76] Inventor: Thomas M. Eells, 10680 W. Pico Blvd., Rm. 260, Los Angeles, Calif.

[22] Filed: Apr. 6, 1972

[21] Appl. No.: 241,659

[52] U.S. Cl. ............................... 123/8.45, 418/241
[51] Int. Cl. ............................................ F02b 55/14
[58] Field of Search .............. 123/8.45, 43 R, 43 C; 418/241

[56] References Cited
UNITED STATES PATENTS

| | | | |
|---|---|---|---|
| 2,974,111 | 9/1934 | Jaworowski | 418/241 |
| 3,606,602 | 9/1971 | Hamada et al | 123/8.45 |
| 1,221,333 | 4/1917 | Killman | 418/241 |
| 1,636,799 | 7/1927 | Berntsen | 123/8.45 |
| 3,083,646 | 4/1963 | Weiss | 418/241 |
| 3,200,796 | 8/1965 | Kraic et al. | 123/8.45 |

Primary Examiner—C. J. Husar
Attorney—Phillip Hoffman

[57] ABSTRACT

A rotary internal combustion engine is described wherein a rotor wheel with rigidly extending vanes is mounted in a piston drum, the vanes being slidably fitted in slots in the drum. The wheel and drum rotate together within the engine housing and eccentrically of one another, and the vanes are shaped to allow free sliding motion in the unyielding slots.

8 Claims, 10 Drawing Figures

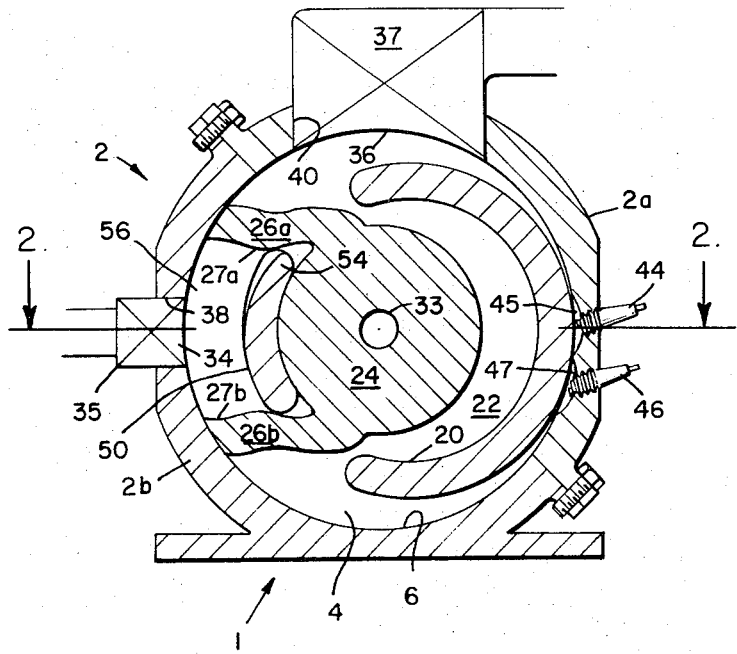
Fig. 1.
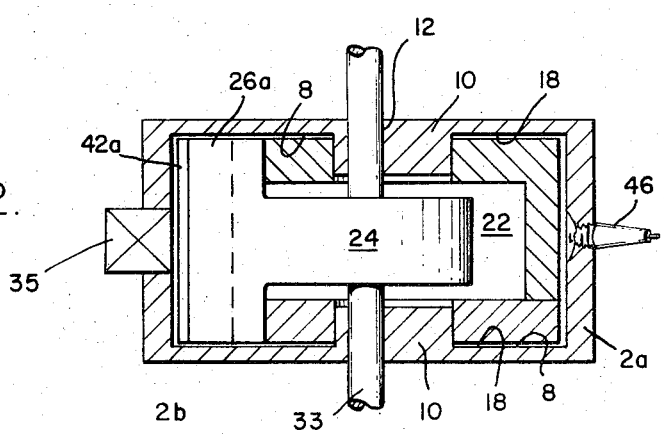
Fig. 2.
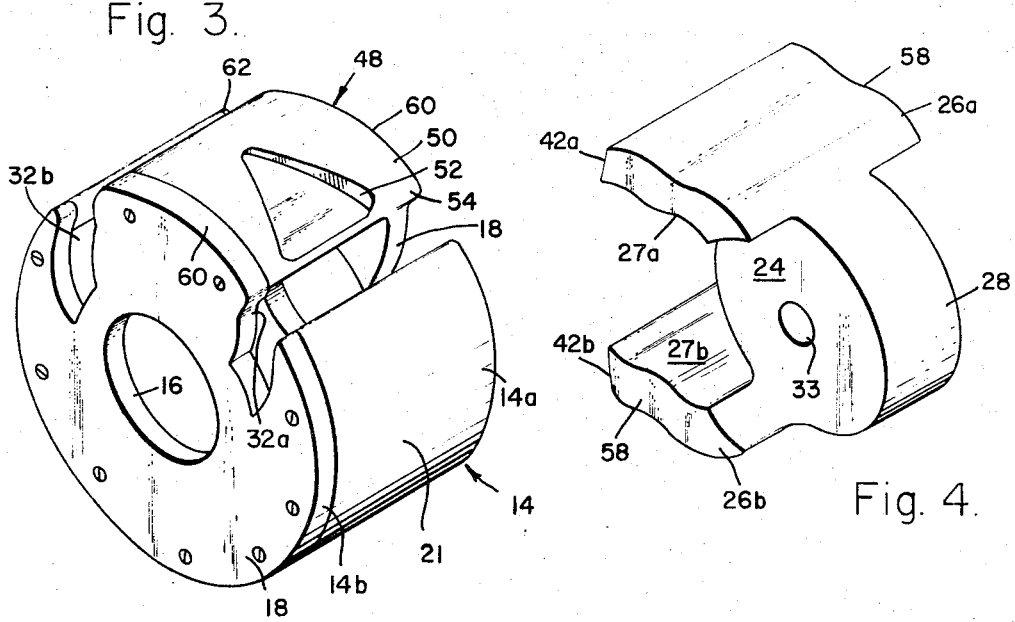
Fig. 3.
Fig. 4.

ROTARY INTERNAL COMBUSTION ENGINE

This invention relates to rotary mechanisms in general, and in particular to internal combustion engines having rotary pistons. More specifically, this invention pertains to an engine having a rotary piston eccentrically mounted with respect to a rotor wheel with radially extending vanes.

Rotary internal combustion engines with rotary pistons eccentrically mounted about a rotor wheel are well known in the art. Typically, the rotor wheel has vanes extending radially therefrom which move freely in and out of slots in the periphery of the rotary piston as the piston and wheel rotate eccentrically in the same direction within a rotation chamber in the engine housing. A variable volume is thereby provided within the rotation chamber wherein fuel can be compressed prior to combustion.

Examples of such engines are described by B. M. Berntsen in U.S. Pat. No. 1,636,799 entitled "Rotary Engine" and by E. W. Rich in U.S. Pat. No. 2,402,257 entitled "Rotary Combustion-Engine." Both Rich and Berntsen accomplish the free vane motion in the slots by complex packing arrangements involving yieldable bearings and/or packing members mounted in the slots and about the vanes. This prevents the vanes from cocking or being bent or broken from the eccentric rotation of the wheel and piston. However, the complexity and number of movable parts involved in each case leave much to be desired. If one of these bearings or packing members breaks, the vane might not be free to move as desired, and the engine would not function. In order to minimize such problems, it is desirable to reduce the number of moving parts in the engine as much as possible. In a rotary engine incorporating rotor-mounted vanes, it is preferable for the rotary piston to accommodate free vane motion in the piston slots without the aid of yieldable packing members or bearings.

The purpose of an engine in a vehicle is to provide rotational acceleration to the wheels via a drive shaft. In an internal combustion engine compressed fuel is ignited, creating an explosion, the force of which accelerates the piston. This force is transmitted to the piston in the form of expanding fumes resulting from the explosion in the combustion chamber. In the case of rotary engines such as the aforementioned, the expanding fumes should be directed against the vanes, thereby causing the wheel and piston to rotate.

In Rich's patent the compressed fuel is urged from the pump chamber through a valve into a separate combustion chamber where it is ignited. The resulting fumes are then passed through another valve and expand into the pump chamber and against a vane, thereby providing the necessary rotational acceleration. When the compressed fuel is urged into the combustion chamber, however, it experiences an increased volume into which it expands. As a result the temperature of the fuel is decreased, diminishing the efficiency and extent of the combustion.

In Berntsen's patent the compressed fuel is retained within the rotor wheel and is ignited at maximum compression, providing more efficient burning than Rich. However, it is not evident from Bertsen's disclosure how the desired rotational acceleration is developed and/or directed. It is merely asserted, without explanation, that the piston is forced to rotate as a result of the ignition of the compressed fuel.

In order to enhance efficiency and optimize engine performance, it is desirable for the combustion of the fuel to occur at the moment of maximum fuel compression. The fuel temperature is highest when fuel compression is maximum, therefore, the fuel will burn easier and more completely if ignited at that time, and the exhaust fumes will contain less air pollutants as a result.

Accordingly, it is an object of this invention to provide a rotary piston drum and a rotor wheel with rigid vanes extending therefrom such that when the wheel is mounted eccentrically in the drum the vanes can move freely in and out of slots in the drum without the aid of yieldable bearings in the slots.

It is another object of the present invention to provide a rotary internal combustion engine which ignites the fuel at maximum compression and directs the resulting expanding fumes against the advancing vanes to produce rotational acceleration in the direction of desired motion.

Still another object of this invention is to provide a rotary internal combustion engine with a minimum number of moving parts.

These and other objects and advantages of this invention are accomplished by a rotary internal combustion engine including the four phases of intake, compression, power, and exhaust, and comprising a hollow housing with a hollow first body rotatably disposed therein. As referred to herein and in the claims, the power phase, or the expansion phase as it is sometimes referred to, commences with the explosion of compressed fuel and includes the expansion of the resulting hot fumes. The first body which may be drum shaped, for example, is tangent to one point on an inner surface of the hollow housing and is mounted on an axis parallel to, and eccentric of an axis of the housing, and may have at least one pair of slots extending partially and essentially radially inward from the periphery thereof.

A second body, such as a wheel for example, is mounted in the first body and rigidly on a shaft along an axis concentric with the housing axis so that it rotates with and eccentrically of the first body. There is at least one pair of facing vanes rigidly extending from the periphery of the second body to the inner surface of the housing. Between each pair of slots in the first body is a piston head with a recess on its periphery. The head moves reciprocatively between the pair of vanes as the bodies rotate eccentrically of one another. The vanes are shaped and spaced to allow the ends of the piston head to wipe the facing sides of the vanes as it rides therebetween, thereby maintaining the fuel chamber leak proof. When there are multiple heads associated with the drum, there need not be slots.

There is at least one fuel chamber associated with the engine and defined by: the inner surface of the housing; the pair of facing vanes; and the piston head. The volume of the fuel chamber varies as the piston head moves relative to the vanes. At least one spark plug, intake port and an exhaust port are circumferentially distributed along the inner surface of the housing so that the fuel chamber communicates appropriately with the ports and plug to facilitate the intake, compression, power, and exhaust phases of the engine cycle.

The recess in the piston head is shaped to direct the expanding fumes within the fuel chamber against the face of the forward vane, thereby accelerating the rotation of the drum and wheel.

The invention will be described in greater detail in conjunction with the accompanying drawings wherein:

FIG. 1 is a cross-sectional view of the engine according to one embodiment of this invention;

FIG. 2 is a partial cross-sectional view of the engine of FIG. 1 taken along section 2—2;

FIG. 3 is a perspective view of the piston drum shown in FIGS. 1 and 2;

FIG. 4 is a perspective view of the wheel and vanes shown in FIGS. 1 and 2;

Figure 5:
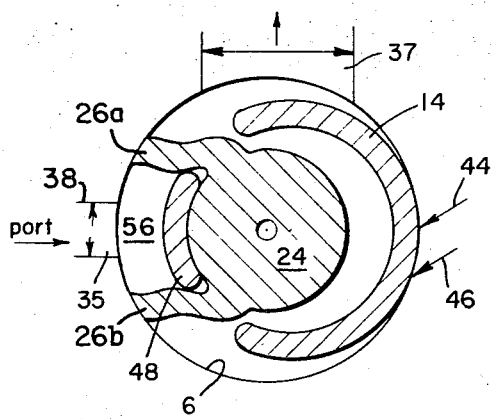
FIGS. 5–9 are cross-sectional views of the engine of FIG. 1 at various times during the engine cycle.

Referring now to FIGS. 1 and 2, there is shown an engine 1, according to one embodiment of the invention, comprising an engine housing 2 having two abutting sections 2a and 2b and having a rotation chamber 4 defined by the inner cylindrical surface 6 and opposite parallel inner end surfaces 8. The two sections 2a and 2b are bolted or otherwise held tightly together by conventional means. Coaxial cylindrical flanges 10 extend longitudinally into the rotation chamber 4 perpendicularly from the inner end surfaces 8 and have a common longitudinal axis which is parallel to and spaced from the longitudinal axis of the chamber 4. The flanges 10 are preferably solid except for cylindrical holes 12 disposed therethrough coaxially along the longitudinal axis of the chamber 4 and eccentrically of the longitudinal axis of the flanges 10. The flanges 10 may, if desired, by annular with walls substantially thinner than the radius of the annulus so long as the longitudinal axis of the housing 2 passes through the annulus eccentrically of the longitudinal axis of the flanges 10.

A piston drum 14, shown in perspective in FIG. 3 according to one embodiment of the invention, comprises a single side walled drum section 14a with an end cover 14b bolted thereon or otherwise suitably attached thereto. Concentric holes 16 are centered in either side wall 18 of the drum 14 for rotatably mounting the drum 14 eccentrically in the housing cavity 4 on the flanges 10. An inner cylindrical surface 20 of the circumferential peripheral wall 21 of the drum section 14a partially defines a drum cavity 22 designed to receive a rotor wheel 24, shown in perspective in FIG. 4. A pair of vanes 26a and 26b, having facing surfaces 27a and 27b, respectively, are integrally associated with and extend from the periphery 28 of the wheel 24 in an approximately radial fashion, the width of each vane 26a and 26b being equal to the width of the drum 14. Slots 32a and 32b in the drum 14 are designed to accommodate these vanes 26a and 26b, respectively, the shapes of which are discussed subsequently in greater detail. If desired, the slots in FIGS. 1 and 3 could be enlarged by removing all but a portion of the wall 21 equal in size to and diametrically opposite the head 48. Such remaining portion of wall 21 would provide desired rotational stability to the drum 14.

The wheel 24 is rigidly and removably mounted on a shaft 33 which is journaled in and extends through the holes 12 of the flanges 10, as in FIG. 2. If the flanges 10 are thin-walled and annular, as suggested above, the shaft 33 would be rotatably supported in a conventional and suitable manner externally of the housing 2 but in any event would be aligned coaxially with the longitudinal axis of the rotation chamber 4.

An intake port 34 and an exhaust port 36 are formed in the housing 2 as shown. An intake valve 35 is disposed in the intake port 34 such that when valve 35 is open, the port 34 communicates with the chamber 4, but when valve 35 is closed, port 34 does not. An exhaust valve 37 is disposed in the exhaust port 36 such that when valve 37 is open, the port 36 communicates with the chamber 4, but when valve 37 is closed, port 36 does not. Thus, the integrity of the surface 6 is maintained when both valves 35 and 37 are closed. The advantage of this port-valve arrangement will become clear subsequently. The intake valve 35 is connected to a conventional fuel supply (not shown). The exhaust valve 37 is normally connected to a muffler or a tail pipe (not shown) in an automobile or may communicate with the atmosphere directly in other applications. The ports 34 and 36 are spaced along the surface 6 so that the arcuate distance between an end 38 of port 34 and an adjacent end 40 of port 36 is larger than the arcuate distance between the tips 42a and 42b of the vanes 26a and 26b, respectively, which in turn is larger than the arcuate width of the intake port 34 measured along the surface 6. The reason for these spacings will become clear from subsequent discussion.

A first spark plug 44 is disposed in a first recess 45 in the surface 6 and communicates with the chamber 4 at a position along the surface 6 diametrically opposite the center of the intake port 34, the diameter between the plug 44 and the port 34 passing perpendicularly through the longitudinal axes of the chamber 4 and of the drum 14. A A second spark plug 46 is disposed in a second recess 47 in the surface 6 and communicates with the chamber 4 at a position on surface 6 within approximately 30 degrees from the first plug 44 and approximately opposite the intake port 34.

The portion of the peripheral wall 21 between the slots 32 is herein referred to as the piston head 48. The surface 50 of the piston head 48 has a recess 52 formed therein beginning to one side of the center of the head 48 and extending across the center to an edge 54 thereof. As the wheel 24 and drum 14 rotate about their respective axes, the piston head 48 will move with respect to the vanes 26. As the wheel 24 rotates, the vanes 26 wipe the surface 6 and the head 48 moves between the vanes 26 reciprocatively towards and away from the surface 6. The volume enclosed by the surfaces 6 and 8, the head 48, and the inner faces 27a and 27b of the vanes 26a and 26b, respectively, varies as the wheel 24 and drum 14 rotate and is referred to herein as the fuel chamber 56.

Figure 6:
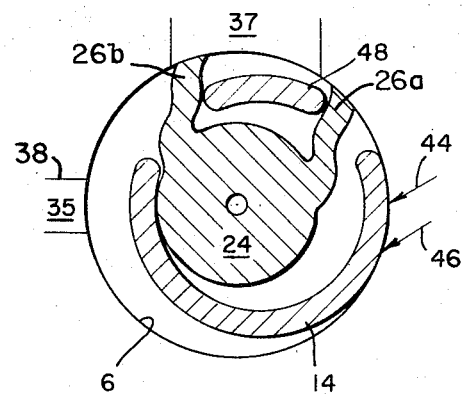
Figure 8:
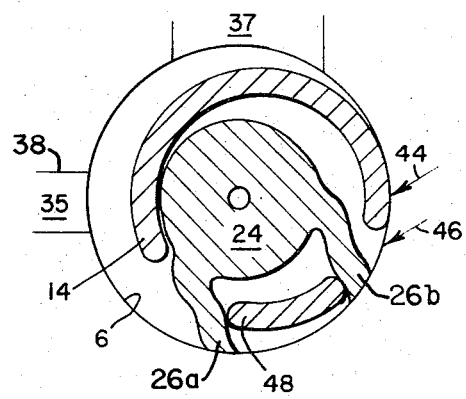
Figure 9:
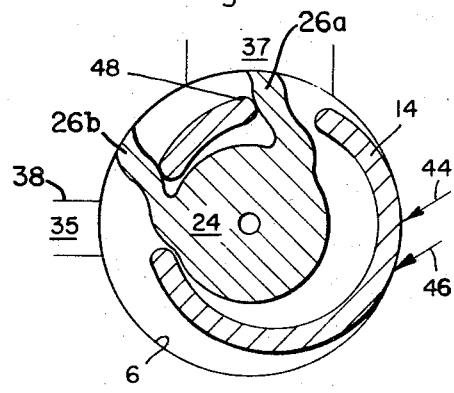

The fuel chamber 56 is essentially leak proof in order to retain the fuel. Accordingly, during the rotations of the wheel 24 and the drum 14, in addition to the tips 42 wiping the surface 6, sides 58 of the vanes 26 and sides 60 of the piston head 48 wipe the end surfaces 8, and edges 54 and 62 of the head 48 wipe the faces 27a and 27b, respectively, as the head 48 rides between the vanes 26. The position of each edge 54 and 62 with respect to surface 6 varies essentially sinusoidally as and because the drum 14 and wheel 24 rotate eccentrically. The edges 54 and 62 are out of phase with each other by an amount equal to the arc subtended by the head 48, causing the head 48 to undulate as it rides between the vanes 26. The head 48 is preferably tangent to the surface 6 at the location of the first spark plug 44 and tangent to the wheel 24 after 180 degrees of rotation from that point, the edges 54 and 62 being equidistant from the surface 6 at these times. These points of tangency are desirable to provide maximum fuel compression at the plug 44 and maximum fuel intake into the chamber 56. At all other times during the rotations, the edges 54 and 62 will not be equidistant from the surface 6 since the head 48 will be cocked, as shown in FIGS. 6, 8 and 9. The edges 54 and 62 are rounded, and the profile of each vane face 27 is wave-shaped with a point of concavity near the tops 64 and the bottoms 66 of the vanes and a point of convexity therebetween, as shown, to accommodate the aforementioned undulating motion of the head 48 without compromising the essentially leak proof feature of the fuel chamber 56. The exact shape, size and radii of curvature of the vanes 26 will depend upon the diameters of the wheel 24, the drum 14, and the rotation chamber 4, as well as the arcuate length of the piston head 48.

The operation of the invention is better understood with reference to FIGS. 5-9 which show the wheel 24 and drum 14 at various positions of the engine cycle. The combustion cycle of the engine, comprising intake, compression, power and exhaust strokes of the piston head 48, requires two complete rotations of the wheel 24 and drum 14. In FIG. 5 the engine is shown during the intake stroke when the volume of the fuel chamber 56 is a maximum. As the wheel 24 rotates, the chamber 56 moves past the intake port 34. When the leading vane 26a passes the end 38 of the port 34, the intake valve 35 is opened to allow fuel to enter and fill the chamber 56. As the trailing vane 26b passes the end 38 of port 34, the valve 35 closes and remains closed until the next intake stroke of the piston head 48.

At this point, the piston head 48 begins its compression stroke as the wheel 24 and drum 14 continue their respective rotations. The fuel chamber 56 becomes smaller as the piston head 48 moves toward the surface 6 and between the vanes 26, thereby compressing the fuel in the chamber 56. FIG. 6 shows the position of the fuel chamber 56 during the compression stroke. The valve 37 is closed at this time, and because it is disposed in the exhaust port 36 as previously described the fuel will remain in the fuel chamber 56 and no fuel will be trapped in the port 36 during compression. Thus all the fuel will be burned.

Figure 7:
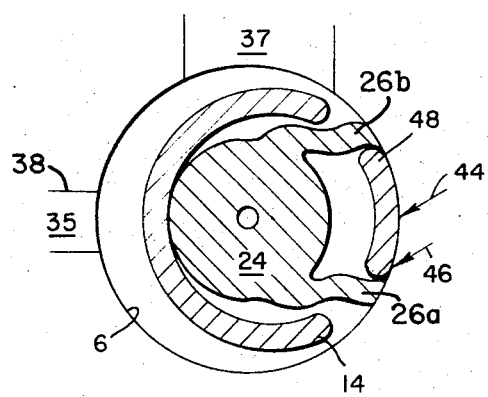

When the piston head 48 is in the position shown in FIG. 7, the fuel is fully compressed. The spark plug 44 is timed to fire at this time, igniting the compressed fuel in the diminished fuel chamber 56. Because the surface 50 of the piston head 48 is tangent to the surface 6 of the housing 2 at this point in the combustion cycle, the fuel chamber 56 comprises very little more than the volume of the recess 52.

The initial rotation of the drum 14 and wheel 24 is accomplished conventionally by an electric engine starter or a manual mechanical crank (not shown) or any other suitable means. This achieves the required rotation thus far described. Further rotation is furnished by the power stroke of the engine which results from the ignition of the compressed fuel.

The recess 52 is widest and deepest at the edge 54 of the piston head 48. When the fuel is ignited, the force of the explosion in the fuel chamber 56 is directed against the walls of the chamber 56 which comprise the recess 52, the surfaces 6 and 8, and the face 27a of the leading vane 26a. Because of the shape of the recess 52 and its location at the vane 26a, much of the force developed is directed against the face 27a of the vane 26a and will provide desired rotational acceleration to the wheel 24 and, therefore, to the drum 14. The ignition of the fuel thus causes the onset of the power stroke.

When the fuel chamber 56 reaches the position shown in FIG. 8, it is opposite the second spark plug 46. The spark plug 46 ignites any unburnt fuel remaining in the chamber 56, thereby providing additional acceleration to the wheel 24 and drum 14. This second burning also diminishes the amount of air-polluting particles in the fumes, which are ultimately exhausted to the atmosphere. In order to ignite this unburnt fuel before the temperature and pressure decrease significantly, the second spark plug 46 is located within essentially 30° of the first spark plug 44. This prevents excessive undesired expansion of the unburnt fuel prior to the second ignition.

The chamber 56 increases as the piston head 48 recedes from the surface 6 due to the respective rotations of the wheel 24 and drum 14. The expansion of the hot fumes in the chamber 56, resulting from the burning of the fuel, aid the rotation of the wheel 24 and the drum 14.

The force of the explosions rotate the chamber 56 past the intake port 34 as the fumes expand and onto the exhaust port 36, as shown in FIG. 9. As the leading vane 26a passes the end 40 of the port 36, the exhaust valve 37 opens, allowing the fumes to be vented from the chamber 56. As the rotation continues, the fumes are compressed toward the exhaust port 36 and are forced out. The intake valve 35 remains closed during exhaust and because it is disposed in the port 34 as previously described, none of the expanding fumes will be trapped in the intake port 34 to contaminate incoming fuel during a subsequent intake phase. Rather, the expanding fumes remain in the fuel chamber 56 until they are vented through port 36.

The rotational momentum gathered by the drum 14 and wheel 24 allow the rotation to continue, and the chamber 56 is brought into communication with the intake port 34. The valve 35 opens again to allow fuel to enter the chamber 56. The flow of fuel into the chamber 56 tends to aid the rotation because as it enters, the shape of the recess directs its flow against the face 27a of the leading vane 26a. The fuel is once again compressed and ignited as before, and the cycle then repeats itself.

Figure 10:
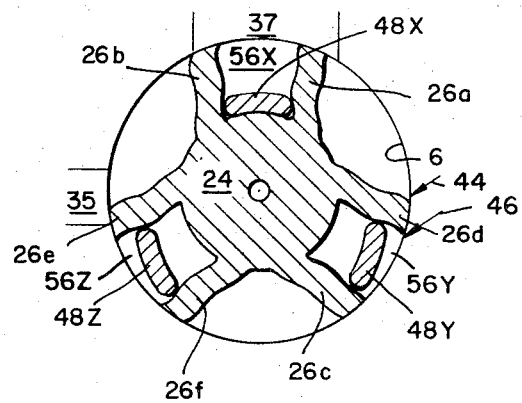
FIG. 10 is a cross-sectional view of the engine according to another embodiment of this invention.

The present invention extends to engines having more than one fuel chamber. Accordingly, there is shown in FIG. 10 a cross-sectional view of the engine 1 in accordance with another embodiment of the present invention in which the wheel 24 has six vanes 26a, 26b, 26c, 26d, 26e, and 26f, for example, and the drum 14 has three piston heads 48x, 48y, and 48z. The engine 1 of FIG. 10 has three fuel chambers 56x, 56y, and 56z partially defined by vanes 26a and 26b and head 48x, vanes 26c and 26d and head 48y, and vanes 26e and 26f and head 48z, respectively. Each head 48 in FIG. 10 is similar to the head 48 of FIG. 1, having a surface 50 with a recess 52 therein.

When the drum 14 has multiple heads 48 symmetrically spaced thereabout, the slots 32 may be dispensed with, as is the case in FIG. 10. The symmetrical distribution of the heads 48, as shown in FIG. 10 for example, furnishes the desired rotational stability to the drum 14, and the wide spaces between successive heads 48 allow free motion of the vanes 26 relative to the drum 14.

The respective combustion cycles of the fuel chambers 56x, 56y, and 56z are the same as for the single fuel chamber in the engine of the first embodiment. However, the sequence between them is such that the fuel chambers do not experience consecutive ignitions. Rather, the ignitions alternate so that if chamber 56x fires on a given revolution of wheel 24, chamber 56y does not, and chamber 56z does. On the next revolution of the wheel 24, chamber 56x does not fire, chamber 56y now does fire, and chamber 56z does not. The cycle then repeats itself. For engines having an odd number of fuel chambers, the firings will continuously alternate among successive fuel chambers as they revolve past the spark plugs 44. Whenever spark plug 44 fires, spark plug 46 fires almost immediately thereafter, as previously discussed.

When the engine 1 comprises only two fuel chambers, they will both experience an ignition during one revolution of the wheel 24 and none during the next succeeding revolution. When the engine comprises an even number of fuel chambers greater than two, the firing pattern during each revolution of the wheel 24 is alternative, i.e., every other fuel chamber fires. The pattern for one complete cycle (i.e., two revolutions of the wheel 24) is an interrupted alternative one. Thus, for an engine with four fuel chambers, the first and third fire during the first revolution and the second and fourth on the next, the pattern repeating thereafter.

The present invention further anticipates using two single fuel chamber engines side by side, with the wheels 24 of the respective engines mounted on a common shaft 33. The combustion cycle of each engine would be delayed by one revolution with respect to the other so that the shaft 33 experiences an acceleration during each revolution. Similarly, this could be done with two double fuel chamber engines. The common shaft would then experience two accelerations during each revolution and uniformly spaced in time.

There has thus been shown and described a rotary internal combustion engine wherein curved vanes rigidly extending from a rotor wheel slide freely without yieldable supports, or in unyieldable slots in a piston drum, as the wheel and drum rotate together and eccentrically of one another.

Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed in a limiting sense.

What is claimed is:

1. A rotary internal combustion engine having a cycle including the four phases of intake, compression, power, and exhaust, said engine comprising:
   a hollow housing;
   a hollow first body rotatably disposed within an inner surface of said housing, and mounted on an axis parallel to, and eccentric of an axis of said housing, said first body having at least one pair of slots extending partially and essentially radially inward from the periphery thereof;
   a second body mounted in said first body and on an axis concentric with said axis of said housing to rotate with, and eccentrically of said first body;
   at least one pair of facing vanes rigidly extending from the periphery of said second body to said inner surface of said housing and slidably disposed in said slots, the profile of each facing vane being wave-shaped with a point of concavity near the top and the bottom thereof and a point of convexity therebetween and the spacing between each said pair of vanes allowing said head to ride therebetween with the ends of said head wiping said facing vanes as said second body and said first body rotate eccentrically of one another in said housing;
   at least one piston head associated with said first body and disposed between said pair of slots, and having a recess on its periphery, said head moving reciprocatively between said pair of facing vanes as said bodies rotate eccentrically of one another;
   at least one variable volume fuel chamber defined by said inner surface of said housing, said pair of facing vanes, and said piston head, the volume of said fuel chamber reciprocatively varying with the motion of said head relative to said facing vanes; and
   a spark plug, an intake port and an exhaust port circumferentially distributed along said inner surface of said housing so that said fuel chamber communicates appropriately with said ports and said plug to facilitate said intake, compression, power and exhaust phases of said engine cycle.

2. The engine claimed in claim 1 wherein said second body is rigidly mounted on a shaft aligned along said axis of said housing, said shaft having supporting means associated therewith for maintaining its position along said axis of said housing.

3. The engine claimed in claim 2 wherein:
   said housing comprises a hollow cylindrical rotation chamber, and said inner surface comprises a cylindrical surface and two end surfaces;
   said first body is a hollow drum;
   said second body is a wheel;
   said piston head is a part of said drum and is defind by said slots, and comprises a forward end and a rearward end; and
   said recess extends essentially from the center to said forward end of said head, said recess being wider and deeper at said forward end.

4. The engine claimed in claim 3 wherein said drum is tangent to said inner surface of said housing essentially at the circumferential location of said spark plug.

5. A rotary internal combustion engine having intake and exhaust ports, comprising:
   a housing with a circular rotation chamber therein partially defined by a circular inner surface thereof, and having an inwardly extending annular flange at either end thereof, said flanges defining the ends of a cylindrical volume which encompasses, and whose longitudinal axis is spaced from, and parallel to the longitudinal axis of said chamber;
   a hollow annular drum rotatably mounted in said housing on, and concentric with said annular flanges, said drum having at least one pair of slots extending partially inward from the circular periphery thereof and a recess on the circular periphery of the portion of said drum between each pair of said slots;
   a shaft rotatably disposed through the center of said chamber and eccentrically through said drum, said shaft having supporting means associated therewith for maintaining its position coaxially with said longitudinal axis of said chamber;

a wheel with at least one pair of facing vanes extending from its periphery, said wheel being rigidly mounted concentrically on said shaft and disposed within and eccentrically of said drum, said vanes beng movably disposed within said slots, the profile of each facing vane being wave-shaped with a point of concavity near the top and the bottom thereof and a point of convexity therebetween and the spacing between each said pair of vanes allowing said head to ride therebetween with the ends of said head wiping said facing vanes as said wheel and said drum rotate eccentrically of one another in said housing;

a variable volume fuel chamber enclosed by the mutually facing surfaces of said vanes, the circular periphery of said portion of said drum therebetween, and the inner surface of said housing, the volume of said fuel chamber varying said drum and said wheel rotate; and a spark plug, an intake port and an exhaust port circumferentially distributed along said inner surface of said housing so that said fuel chamber communicates appropriately with said ports and said plug to facilitate the intake, compression, power and exhaust phases of the engine cycle.

6. The engine claimed in claim 5 wherein:

said portion of said drum between each pair of said slots is a piston head which moves between said pair of vanes as said drum rotates, each said head having a forward end and a rearward end; and each said recess extends essentially from the center to said forward end of said head and is deeper at said forward end.

7. A rotary internal combustion engine having a cycle including the four phases of intake, compression, power, and exhaust, said engine comprising:

a hollowing housing;

a hollow first body rotatably disposed within an inner surface of said housing, and mounted on an axis parallel to, and eccentric of an axis of said housing;

at least one piston head associated with said first body and having an arcuate peripheral surface with a recess therein;

a second body mounted in said first body and on an axis concentric with said axis of said housing to rotate with, and eccentrically of said first body;

at least one pair of facing vanes rigidly extending from the periphery of said second body to said inner surface of said housing, and disposed at opposite ends of said head, said head moving reciprocatively between said vanes as said bodies rotate eccentrically of one another, said ends of said head wiping said vanes continuously during said reciprocative motion of said head, the profile of each facing vane being wave-shaped with a point of concavity near the top and the bottom thereof and a point of convexity therebetween to accommodate said piston head as it moves therebetween, the volume defined by said inner surface of said housing, said pair of facing vanes, and said piston head constituting a fuel chamber whose volume varies with the motion of said head relative to said vanes; and a spark plug, an intake port and an exhaust port circumferentially distributed along said inner surface of said housing so that said fuel chamber communicates appropriately with said ports and said plug to facilitate said intake, compression, power and exhaust phases of said engine cycle.

8. The engine claimed in claim 7 wherein:

said housing comprises a hollow cylindrical rotation chamber, and said inner surface comprises a cylindrical surface and two end surfaces;

said first body is a hollow drum with its circumferential wall periodically and symmetrically interrupted to define multiple said piston heads each with a forward and rearward end;

said second body is a wheel rigidly mounted on a shaft aligned along said axis of said housing, said shaft having supporting means associated therewith for maintaining its position along said axis of said housing; and said recess on each said head extends essentially from the center to said forward end thereof and is wider at said forward end.

* * * * *